United States Patent
Porikli et al.

(10) Patent No.: US 7,724,961 B2
(45) Date of Patent: *May 25, 2010

(54) METHOD FOR CLASSIFYING DATA USING AN ANALYTIC MANIFOLD

(75) Inventors: Fatih M. Porikli, Watertown, MA (US); Oncel C. Tuzel, Piscataway, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 878 days.

This patent is subject to a terminal disclaimer.

(21) Appl. No.: 11/517,645

(22) Filed: Sep. 8, 2006

(65) Prior Publication Data

US 2008/0063264 A1 Mar. 13, 2008

(51) Int. Cl.
*G06K 9/62* (2006.01)
*G06E 1/00* (2006.01)

(52) U.S. Cl. ........................ 382/224; 706/20
(58) Field of Classification Search .................. 382/224
See application file for complete search history.

(56) References Cited

U.S. PATENT DOCUMENTS

| | | | |
|---|---|---|---|
| 5,602,964 A * | 2/1997 | Barrett | 706/25 |
| 5,860,936 A * | 1/1999 | Levin | 600/558 |
| 6,121,969 A * | 9/2000 | Jain et al. | 715/850 |
| 6,353,814 B1 * | 3/2002 | Weng | 706/12 |
| 6,459,808 B1 * | 10/2002 | Brand | 382/155 |
| 6,701,016 B1 * | 3/2004 | Jojic et al. | 382/209 |
| 7,035,467 B2 * | 4/2006 | Nicponski | 382/224 |
| 2004/0205036 A1 * | 10/2004 | Prabhu et al. | 706/19 |
| 2006/0078205 A1 * | 4/2006 | Porikli et al. | 382/204 |
| 2007/0133878 A1 * | 6/2007 | Porikli et al. | 382/190 |
| 2007/0183629 A1 * | 8/2007 | Porikli et al. | 382/103 |

OTHER PUBLICATIONS

A Riemannian Framework for Tensor Computing, International Journal of Computer Vision, Pennec et al., vol. 66, No. 1, pp. 41-66, Dec. 23, 2005.*
Region Covariance: A Fast Descriptor for Detection and Classification, Tuzel et al., Springer Berlin/Heidelberg, vol. 3952/2006, pp. 589-600, Jul. 26, 2006.*
D. Nowicki et al., Averaging on Riemannian Manifolds and Unsupervised Learning using Neural Associative Memory, ESANN'05 proceedings, Apr. 2005, pp. 181-186, Belgium.
X. Pennec et al., A Riemannian Framework for Tensor Computing, IJCV, 2006, pp. 41-66, vol. 66, No. 1, Springer Science + Business Media, Inc., The Netherlands.

* cited by examiner

*Primary Examiner*—Bhavesh M Mehta
*Assistant Examiner*—David P Rashid
(74) *Attorney, Agent, or Firm*—Dirk Brinkman; Gene Vinokur

(57) ABSTRACT

A computer implemented method constructs a classifier for classifying test data. High-level features are generated from low-level features extracted from training data. The high level features are positive definite matrices in a form of an analytical manifold. A subset of the high-level features is selected. An intrinsic mean matrix is determined from the subset of the selected high-level features. Each high-level feature is mapped to a feature vector onto a tangent space of the analytical manifold using the intrinsic mean matrix. Then, an untrained classifier model can be trained with the feature vectors to obtain a trained classifier. Subsequently, the trained classifier can classify unknown test data.

17 Claims, 9 Drawing Sheets

100

300

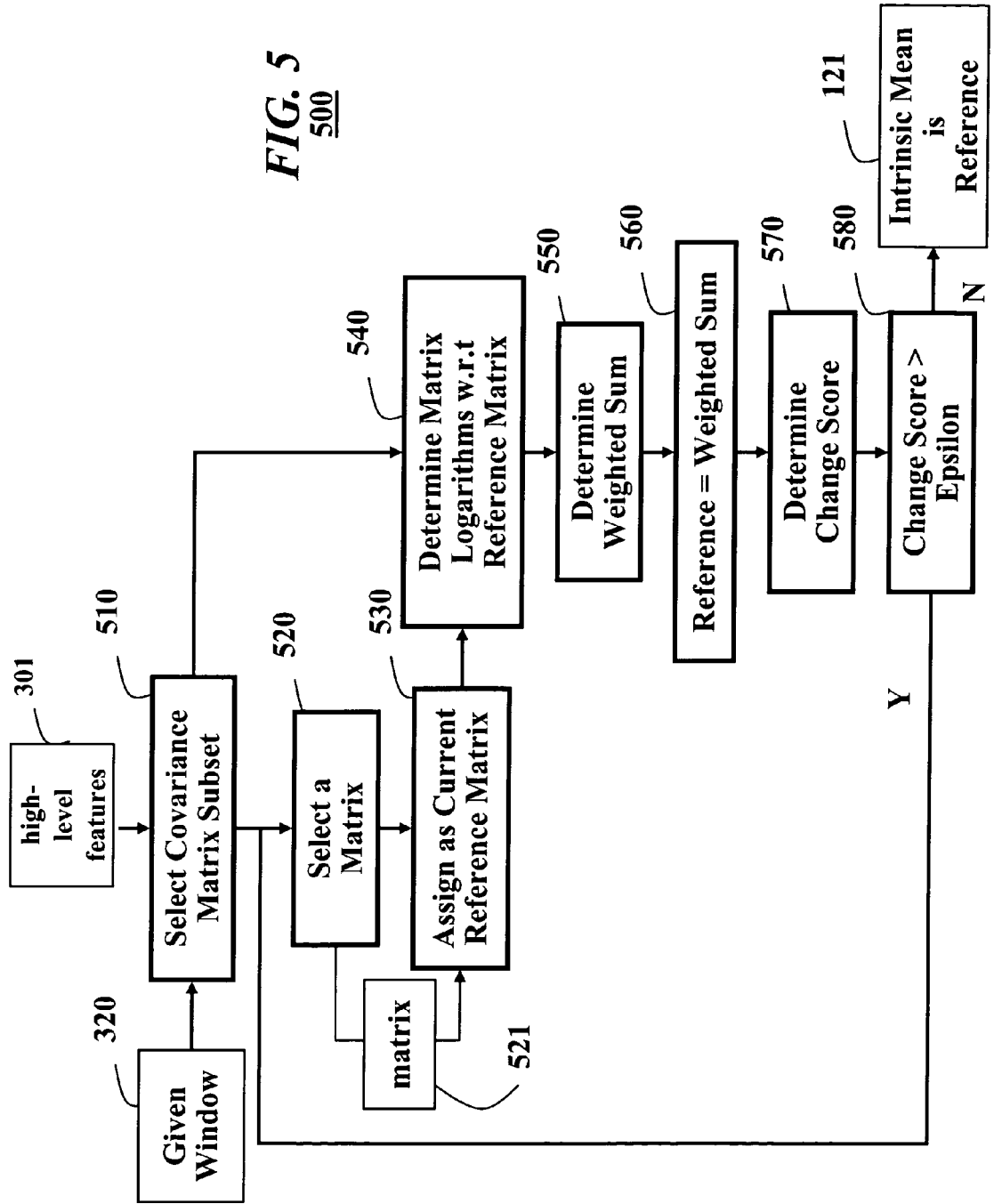

METHOD FOR CLASSIFYING DATA USING AN ANALYTIC MANIFOLD

FIELD OF THE INVENTION

This invention relates generally to classifying data, and more particular to constructing a classifier using training images and then classifying test images using the constructed classifier where the training and testing uses low-level features extracted from the images.

BACKGROUND OF THE INVENTION

Classifiers

Data classifiers have many practical applications in the sciences, research, engineering, medicine, economics, and sociology fields. Classifiers can be used for medical diagnosis, portfolio analysis, signal decoding, OCR, speech and face recognition, data mining, search engines, consumer preference selection, fingerprint identification, and the like.

Classifiers can be trained using either supervised or unsupervised learning techniques. In the later case, a model is fit to data without any a priori knowledge of the data, i.e., the input data are essentially a set of random variables with a normal distribution. The invention is concerned with supervised learning, where features are extracted from labeled training data in order to learn a function that maps observations to output.

Generally, a classifier is a mapping from discrete or continuous features X to a discrete set of labels Y. For example, in a face recognition system, features are extracted from images of faces. The classifier then labels each image as being, e.g., either male or female.

A linear classifier uses a linear function to discriminate the features. Formally, if an observed input to the classifier is a feature vector $\vec{x}$, then an estimated output label y is $$y = f(\vec{w} \cdot \vec{x}) = f\left(\sum_j w_j x_j\right),$$

where $\vec{w}$ is a real vector of weights, and f is a function that converts the dot product of the two vectors to the desired output. Often, f is a simple function that maps all values above a certain threshold to "yes" and all other values to "no".

In such a two-class (binary) classification, the operation of the linear classifier "splits" a high-dimensional input space with a hyperplane. All samples on one side of the hyperplane are classified as "yes", while the other samples are classified as "no".

The linear classifier is often used in situations where the speed of classification is an issue, because the linear classifier is often the fastest classifier, especially when the feature vector $\vec{x}$ is sparse.

Riemannian Manifold

In Riemannian geometry, a Riemannian manifold (M, g), is a real differentiable manifold M in which each tangent space is equipped with an inner product g in a manner which varies smoothly from point to point. This allows one to define various geometric and derivative notions such as the length of curves, angles, areas or volumes, curvature, gradients of functions and divergence of vector fields. A Riemannian manifold can be defined as a metric space which is isometric to a smooth submanifold of the manifold. A Riemann manifold is an example of an analytic manifold, which is a topological manifold with analytic transition maps.

The inner product structure of the Riemann manifold is given in the form of a symmetric 2-tensor called the Riemannian metric. The Riemann metric can be used to interconvert vectors and covectors, and to define a rank-4 Riemann curvature tensor. Any differentiable manifold can be given a Riemannian structure.

At a fixed point, the tangent bundle of a smooth manifold M, or indeed any vector bundle over a manifold, is a vector space, and each such space can carry an inner product. If such a collection of inner products on the tangent bundle of a manifold vary smoothly as one traverses the manifold, then concepts that were defined only point-wise at each tangent space can be extended to yield analogous notions over finite regions of the manifold.

For example, a smooth curve $\alpha(t)$: $[0,1] \to M$ has a tangent vector $\alpha'(t_0)$ in the tangent space $TM(t_0)$ at any point $t_0 \in (0, 1)$, and each such vector has a length $\|\alpha'(t_0)\|$, where $\|\cdot\|$ denotes the norm induced by the inner product on $TM(t_0)$. The integral of these lengths gives the length of the curve $\alpha$:

$$L(\alpha) = \int_0^1 \|\alpha'(t)\| dt.$$

In many instances, in order to pass from a linear-algebraic concept to a differential-geometric concept, the smoothness requirement is very important. Every smooth (continuous) submanifold of $R^n$ has an induced Riemannian metric g. The inner product on each tangent space is the restriction of the inner product on the submanifold $R^n$.

In fact, it follows from the Nash embedding theorem, which states that every Riemannian manifold can be embedded isometrically in the Euclidean space $R^n$, all Riemannian manifolds can be realized this way.

In particular, one can define a Riemannian manifold as a metric space. A metric space is a set where distances between elements of the set are defined, e.g., a three-dimensional Euclidean space. The metric space is isometric to a smooth submanifold $R^n$ with the induced intrinsic metric. Here, isometry means preserving the length of curves. This definition is quite useful to construct geometric intuitions in Riemannian geometry.

Usually, the Riemannian manifold is defined as a smooth manifold with a smooth section of positive-definite quadratic forms on the tangent bundle. Turning the Riemann manifold into a metric space is nontrivial. Even though a Riemann manifold is usually "curved," there is still a notion of "straight lines" on the manifold, i.e., the geodesics that locally join points along shortest paths on a curved surface.

Riemann Manifolds and Unsupervised Learning

Averaging of Riemann manifolds and unsupervised learning using neural associative memory are described generally by Nowicki Dimitri, Oleksiy Dekhtyarenko, "Averaging on Riemannian manifolds and unsupervised learning using neural associative memory," European Symposium on Artificial Neural Networks, April 2005, incorporated herein by reference.

That method is based on Hopfield-type pseudo-inverse associative memory. One can represent synaptic matrices of this type of neural network as points on a Grassmann manifold. The Grassmann manifold is a certain collection of vector subspaces of a vector space. The Grassmann manifold is special case of a flag manifold. The flag manifold admits the structure of manifolds in a natural way and is useful in the theory of Lie groups.

SUMMARY OF THE INVENTION

A computer implemented method constructs a classifier for classifying test data. High-level features are generated from low-level features extracted from training data.

The high level features are positive definite matrices in a form of an analytical manifold. A subset of the high-level features is selected. An intrinsic mean matrix is determined from the subset of the selected high-level features.

Each high-level feature is mapped to a feature vector onto a tangent space of the analytical manifold using the intrinsic mean matrix. Then, an untrained classifier model can be trained with the feature vectors to obtain a trained classifier.

Subsequently, the trained classifier can classify unknown test data.

BRIEF DESCRIPTION OF THE DRAWINGS

FIG. 5 is a flow diagram of a procedure for determining an intrinsic mean covariance matrix according to an embodiment of the invention.

DETAILED DESCRIPTION OF THE PREFERRED EMBODIMENT

Classifier Construction and Classification

Figure 1:
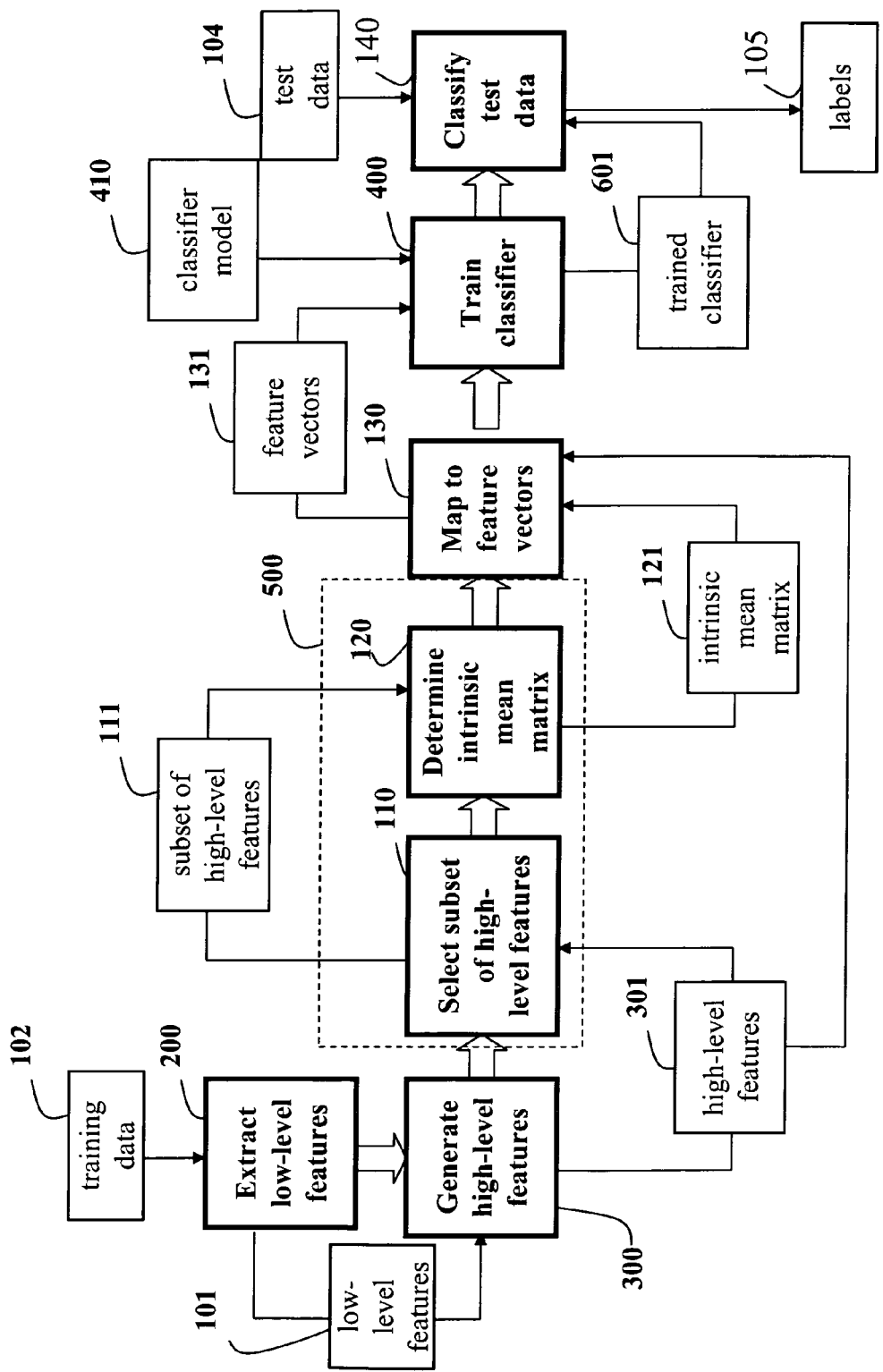
FIG. 1 is a flow diagram of a method for training a classifier for classifying test data according to an embodiment of the invention.

FIG. 1 shows a method 100 for constructing a classifier according to an embodiment of our invention. The classifier is constructed and trained using training data. By training data, we mean that the input data (observations) are known and already labeled. The training data are used both to extract (labeled) features, and to verify or measure a performance of the classifier after training. The trained classifier can then be used to classify unknown test data.

Low-level features 101 are extracted 200 from training data 102. The low-level features 101 are used to generate 300 high-level features 301. The high level-features are the form of positive definite matrices on an analytical manifold.

A subset 111 of the high-level feature 301 is selected 110. The subset 111 of the selected high-level-features is used to determine 120 an intrinsic mean covariance matrix 121. The intrinsic mean covariance matrix 121 defines a tangent space of the analytical manifold for the subset of high level features. Tangent space is a local Euclidean space. The intrinsic mean matrix is used to map (project) 130 each high-level feature 301 to a feature vector 131 in the local Euclidean space of the manifold. Then, the feature vectors 131 are used to train 400 a classifier model 410 to produce the trained classifier 601.

Subsequently, the trained classifier 601 can be used to classify 140 unknown test data 104. The classification assigns labels 105 to the test data. Feature vectors are produces for the test data in the same manner as described above for the training data.

Extract Low-Level Features

Figure 2:
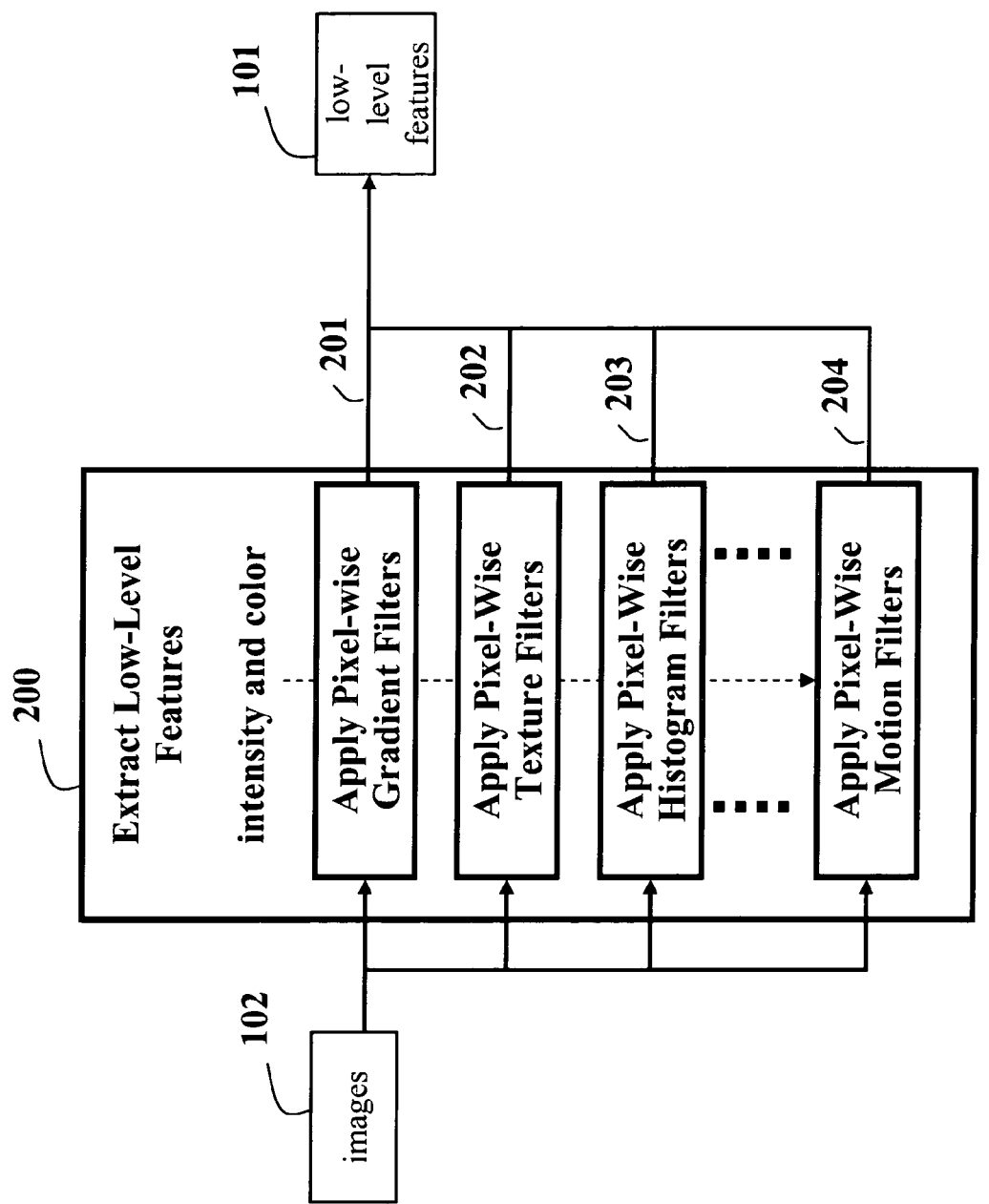
FIG. 2 is a flow diagram of a procedure for extracting low-level features from test data according to an embodiment of the invention.
Figure 3:
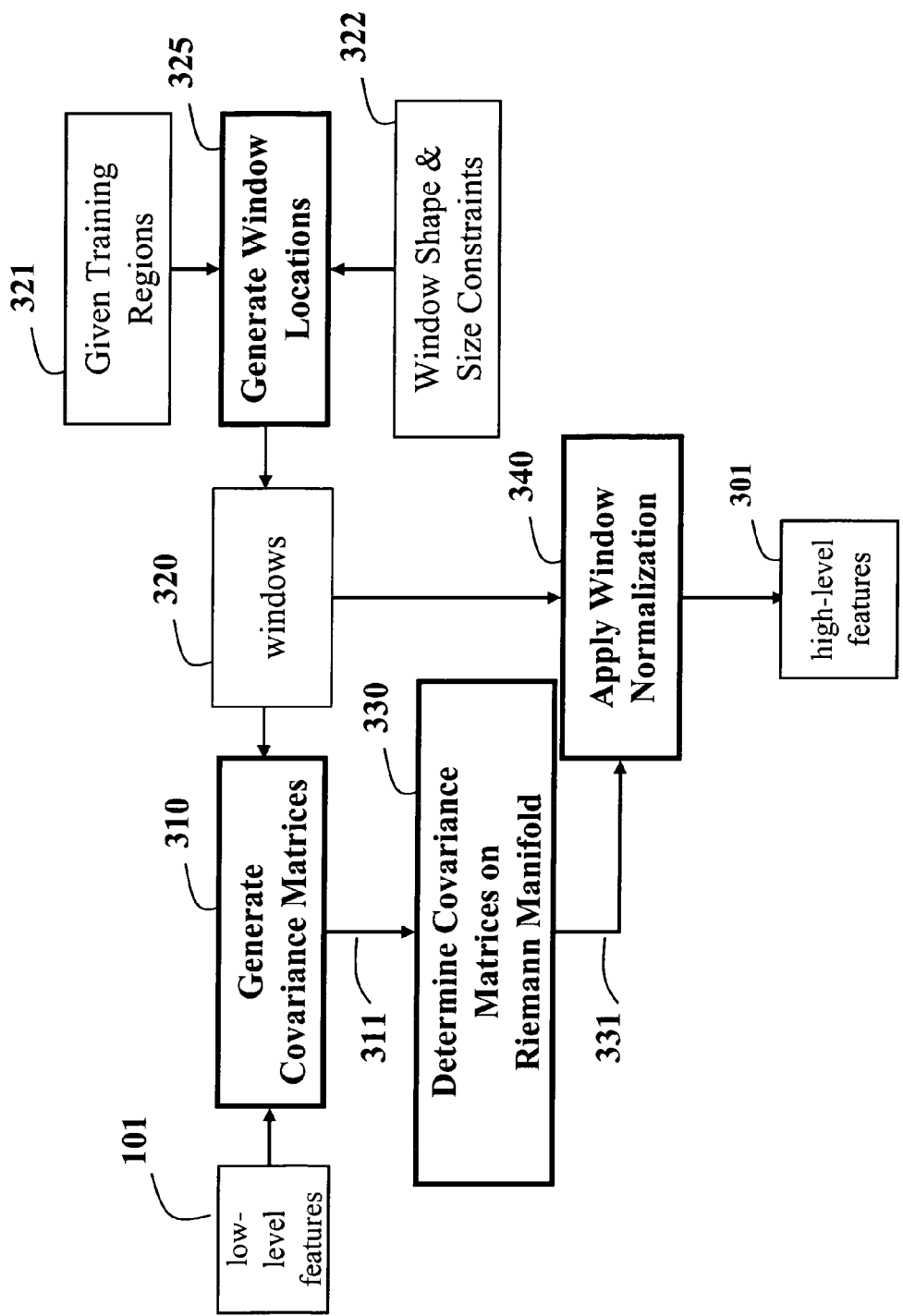
FIG. 3 is a flow diagram of a procedure for converting low-level features to high-level features according to an embodiment of the invention.

FIG. 2 shows the details of the extraction 200 for training data 102, e.g., an image or a video. It should be noted that the extraction of low-level features can also be for other data, such as acoustic signals, medical images, data sampled from physical processes, financial data, and the like.

The low-level features 101 can include pixel intensities, pixel colors, and derivative low-level features, such as gradients 201, texture 202, color histograms 203, and motion vectors 204. Other data will have different low-level features. For example, low-level audio features could include spectral features.

Generate High-Level Features

The low-level features 101 are used to generate 300 the high-level features 301 on the analytical manifold. In a preferred embodiment, the high-level features are positive definite matrices on a Riemann manifold, projected onto a tangent space using the intrinsic mean matrix. More specifically the positive definite matrices are covariance matrices of the low-level features. This is done by determining 310 covariance matrices 311 from the low-level features using windows 320.

High-level features in the form of covariance matrices are described generally in U.S. patent application Ser. No. 11/305,427, "METHOD FOR CONSTRUCTING COVARIANCE MATRICES FROM DATA FEATURES," filed by Porikli et al., on Dec. 14, 2005, incorporated herein by reference. The covariance matrix provides a natural way for combining multiple low-features features that might otherwise be correlated. The diagonal entries of each covariance matrix represent the variance of each high-level feature and the non-diagonal entries represent the correlations of the high-level features. Because covariance matrices do not lie in Euclidean space, that method uses a distance metric involving generalized eigenvalues, which follow from Lie group structures of positive definite matrices.

The image can be partitioned into regions 321. Locations of windows 320 are generated 325 from the given training regions 321, according shape and size constraints 322. For each window, the low-level features 101 in the window 320 are used to determine a covariance matrix.

Using the windows 320, the covariance matrices 311 can be constructed 330 on the Riemann manifold. The matrices 311 can then be normalized 340 using the windows 320 to produce the high-level features 301.

Projection to Tangent Space

The structure of the analytical manifold is specified by a Riemannian metric which is defined by a collection of inner products, $<.,.>X$, on the tangent space at each point of the manifold. The inner product induces a norm for the tangent vectors:

$$y \in TX, \|y\|^2 X = <y,y>X.$$

An invariant Riemannian metric on the tangent space of symmetric positive definite matrices is given by $$<y, z>x = tr\left(X^{-\frac{1}{2}} y X^{-1} z X^{-\frac{1}{2}}\right).$$

Distances on the manifold are defined in terms of minimum length curves between points on the manifold. The curve with the minimum length is called the geodesic and the length of the curve is the intrinsic distance. The relation between the vectors on the tangent space and the geodesics are given by an exponential map.

For each tangent vector y∈TX, there is a unique geodesic starting at point X with initial velocity y and ending at expX (y). An inverse of the exponential map is given by a logarithm operator. The exponential map associated to the Riemannian metric is given by $$\exp_X(y) = X^{\frac{1}{2}} \exp(X^{-\frac{1}{2}} y X^{-\frac{1}{2}}) X^{\frac{1}{2}}.$$

In general, the inverse of the exponential map, logX, can only be defined in a small local neighborhood of point X. Fortunately, the defined exponential map is a diffeomorphism. Therefore, the logarithm is defined at all the points on the manifold, and the logarithm is unique.

Intrinsic Mean Covariance Matrices

We improve classification accuracy by determining the intrinsic mean covariance matrix 121. Covariance matrices do not conform to Euclidean geometry. Therefore, we use elliptical or Riemannian geometry. Several methods are known for determining the mean of symmetric positive definite (Hermitian) matrices, such as our covariance matrices (high-level features 301), see Pennec et al., "A Riemannian framework for tensor computing," In Intl. J. of Computer Vision, volume 66, pages 41-66, January 2006, incorporated herein by reference.

FIG. 5 shows the selecting step 110 and determining step 120 in greater detail. The intrinsic mean covariance matrix 121 is obtained 500 as follows. For a given window 320 and the high-level features 301 therein, a subset of the covariance matrices (high-level features 301) is selected 510. A matrix 521 is selected 520 from the subset 111. The selected matrix 521 is assigned 530 as a current reference matrix.

A mean logarithm with respect to the current reference matrix is determined 540. A weighted sum is determined 550. The weighted sum is compared 560 to the reference matrix, and a change score is determined 570. If the change score is greater than some small threshold ε(Y), then a next matrix is selected and assigned.

Otherwise if not (N), the reference matrix is assigned as the intrinsic mean covariance matrix 121. The intrinsic mean covariance matrix can now be used to map each high-level feature 301 to a corresponding feature vector 131. The feature vectors are used to train the classifier model 410 as stated above.

Classifiers

Figure 4A:
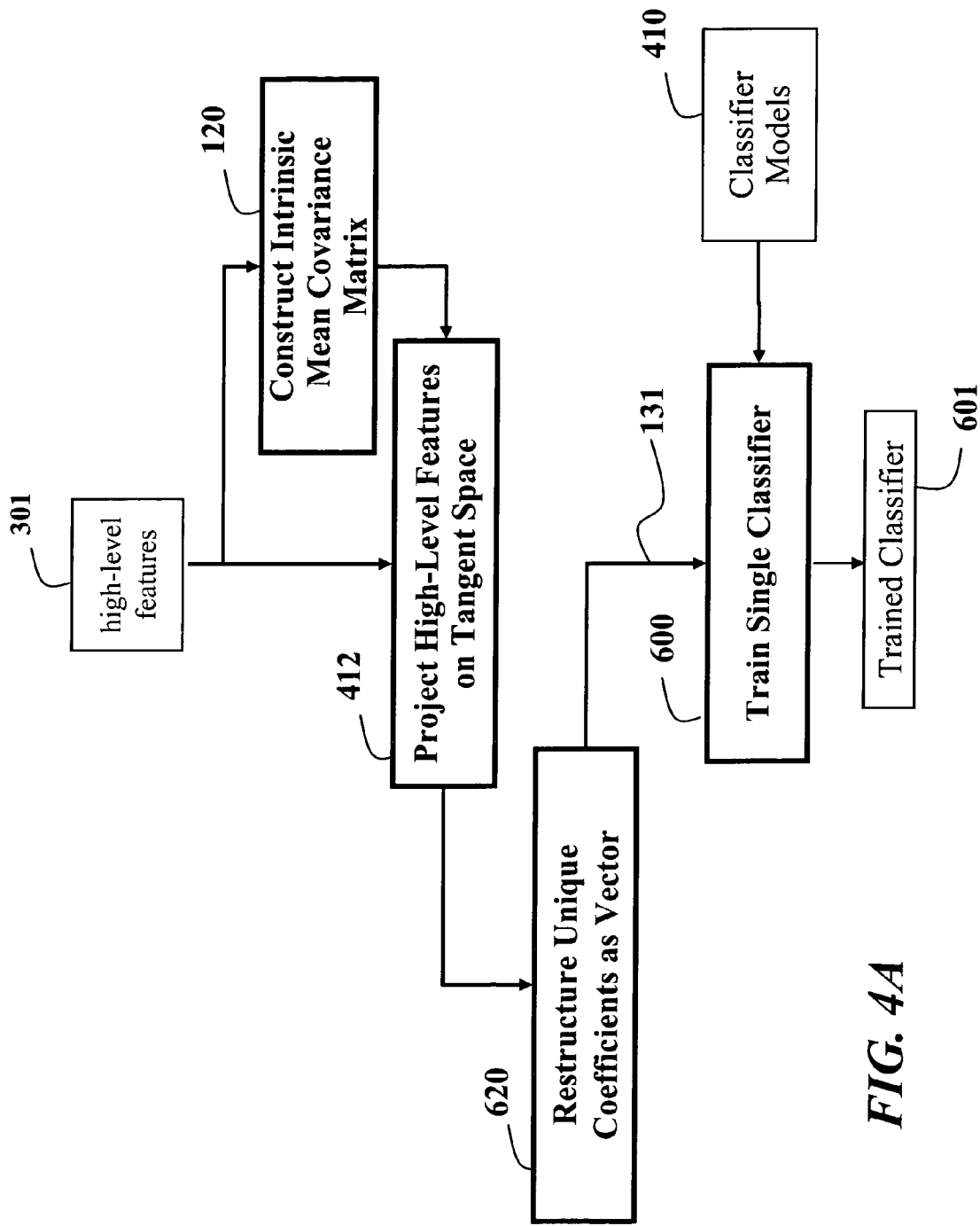
FIGS. 4A-4E are flow diagrams of procedures for training a classifier according to an embodiment of the invention.
Figure 4B:
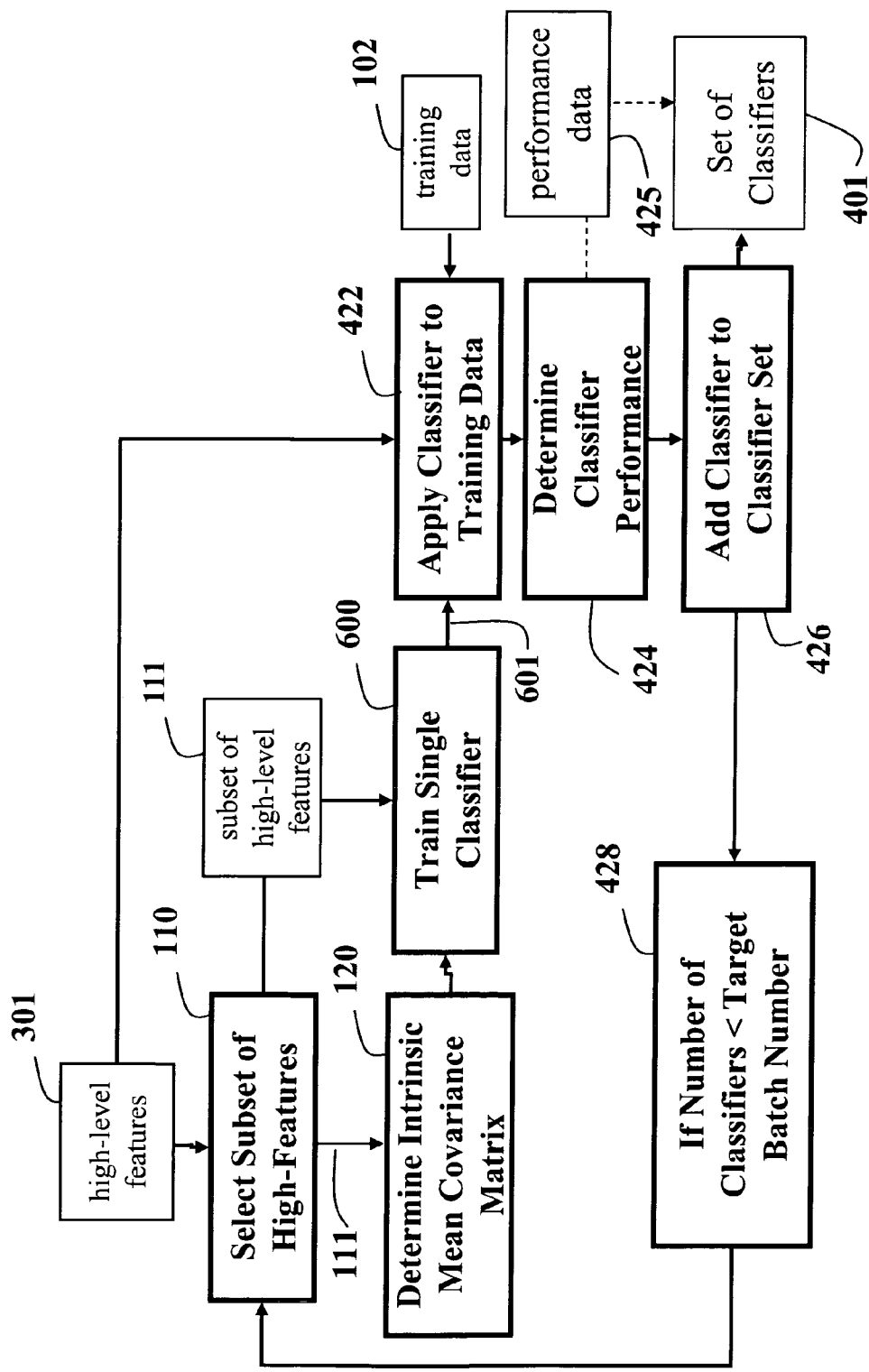
Figure 4C:
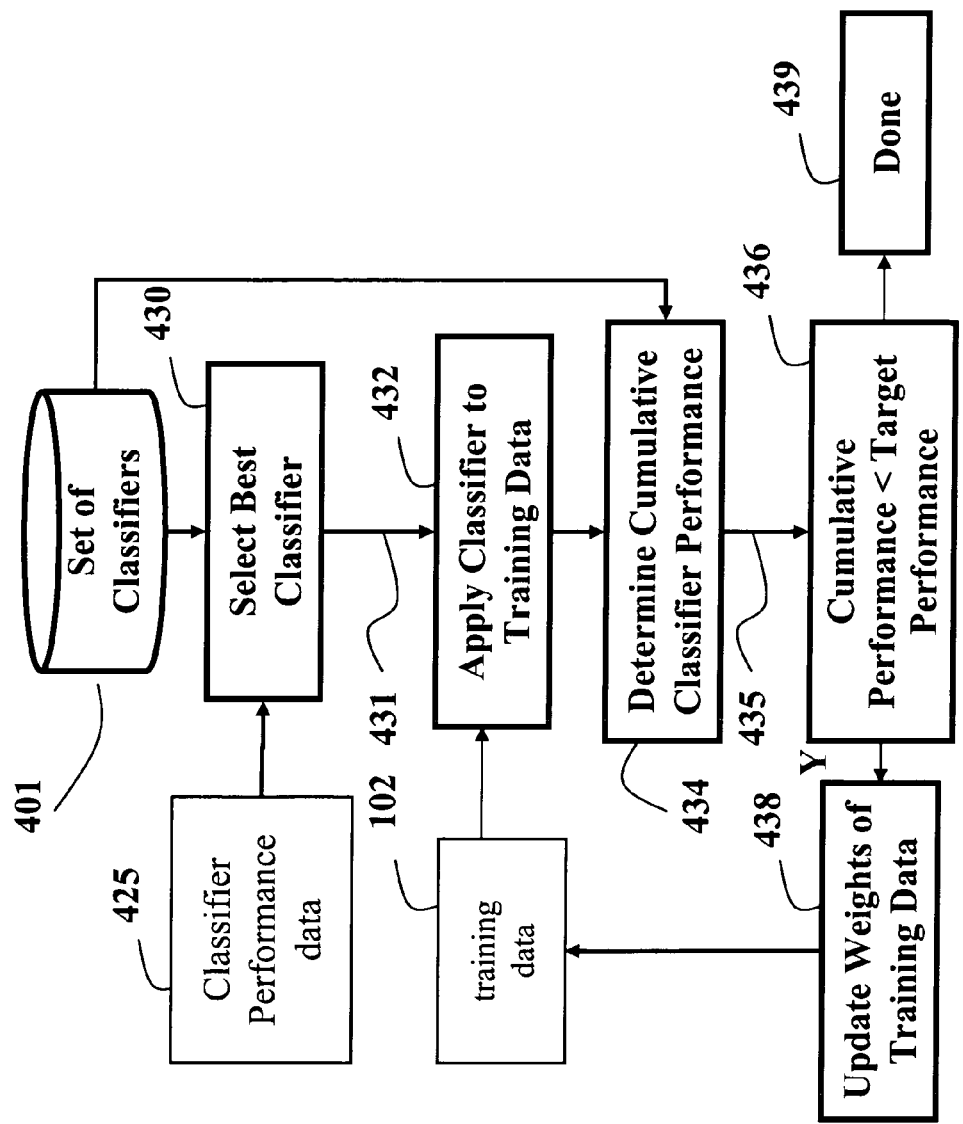
Figure 4D:
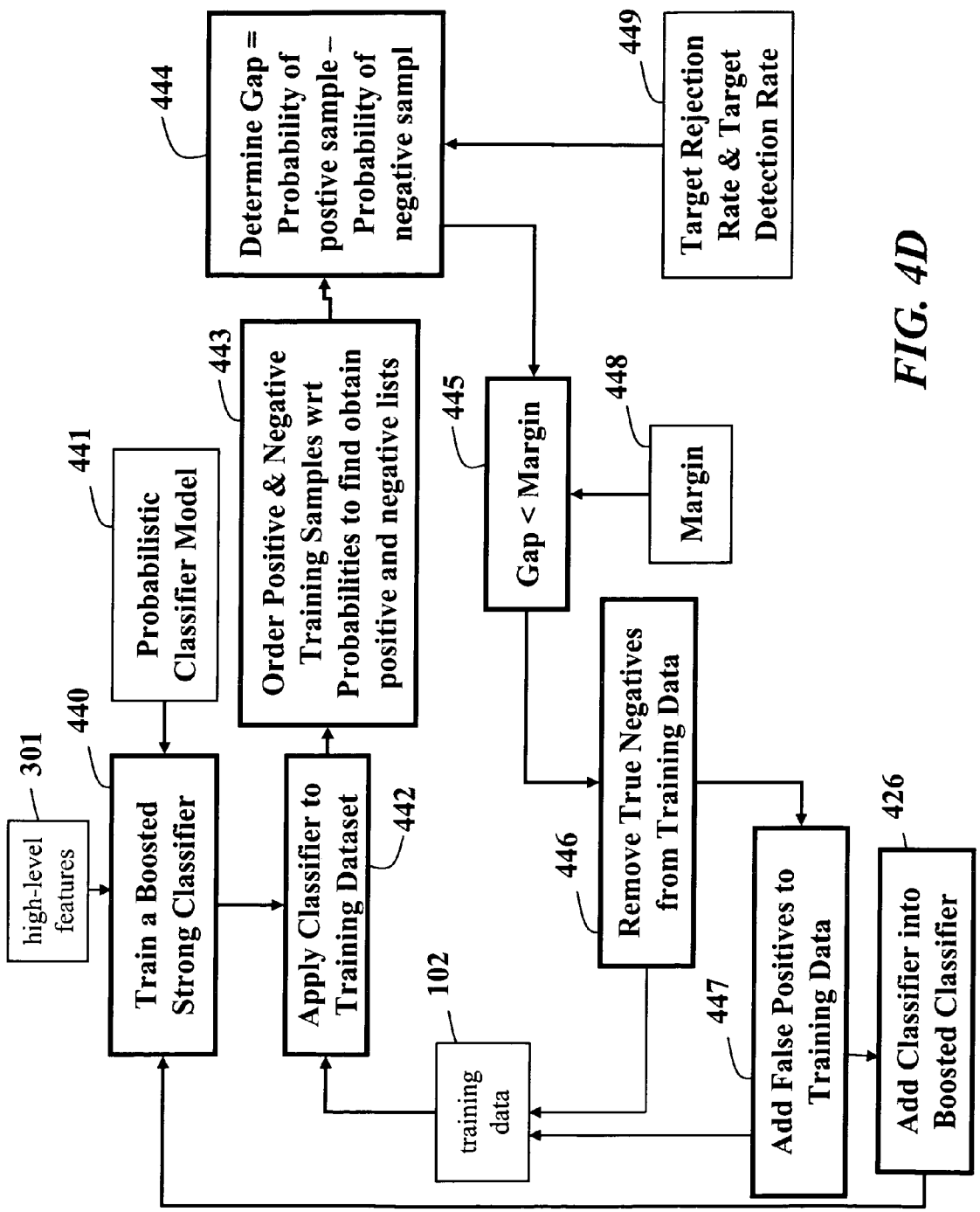

FIGS. 4A-4E show alternative embodiments for training the classifier 601. FIG. 4A shows a single classifier method. FIGS. 4B-4C show a boosted classifier method. FIG. 4D shows a margin cascade boosted classifier method.

Single Classifier

As shown in FIG. 4A, a single classifier 601 is trained as follows. The intrinsic mean covariance matrix is determined 120 from the high-level features 131. The high-level features 301 are projected 412 on a tangent space using the intrinsic mean covariance matrix 121 to map the high-level features. Unique coefficients of the matrix, after the projection, are reconstructed 620 as the feature vector 131. Using a selected classifier model 410 from available classifier models, the selected classifier is then trained using the feature vectors 131.

Boosted Classifier

FIG. 4B shows the steps for training a boosted classifier. A subset 111 of the high-level features 301 is selected 110. The intrinsic mean covariance matrix is determined 120 from the selected subset of high-level features 111. These features are used to train 600 a selected single classifier to produce a trained classifier 601.

The trained classifier is applied 422 to a portion of the training data 102, and a performance 125 of the classifier can be determined 424. If the performance is acceptable, then the classifier is added 426 to the set of classifiers 401.

Additional classifiers can then be evaluated, via step 428 and selecting additional subsets of high-level features, until the desired number of classifiers have been accumulated in the set of classifiers 401. It should be noted, that a different subset of the high-level features can be selected for each classifier to be trained. In this case, an intrinsic mean covariance matrix is determined for each selected subset of high-level features.

For the boosting, the set of classifiers 401 can be further evaluated as shown in FIG. 4C. Using the performance data 425, a best classifier 431 is selected 430. The best classifier 431 is applied 432 to a portion of the training data 102 and a cumulative performance 435 is determined 434. If the cumulative performance 435 is less than a predetermined target performance, in step 436, then the weights of the training data are updated 438, and another classifier can be trained. Otherwise, the training of the boosted classifier is done 439.

Classifier with Adjustable Margin

Figure 4E:
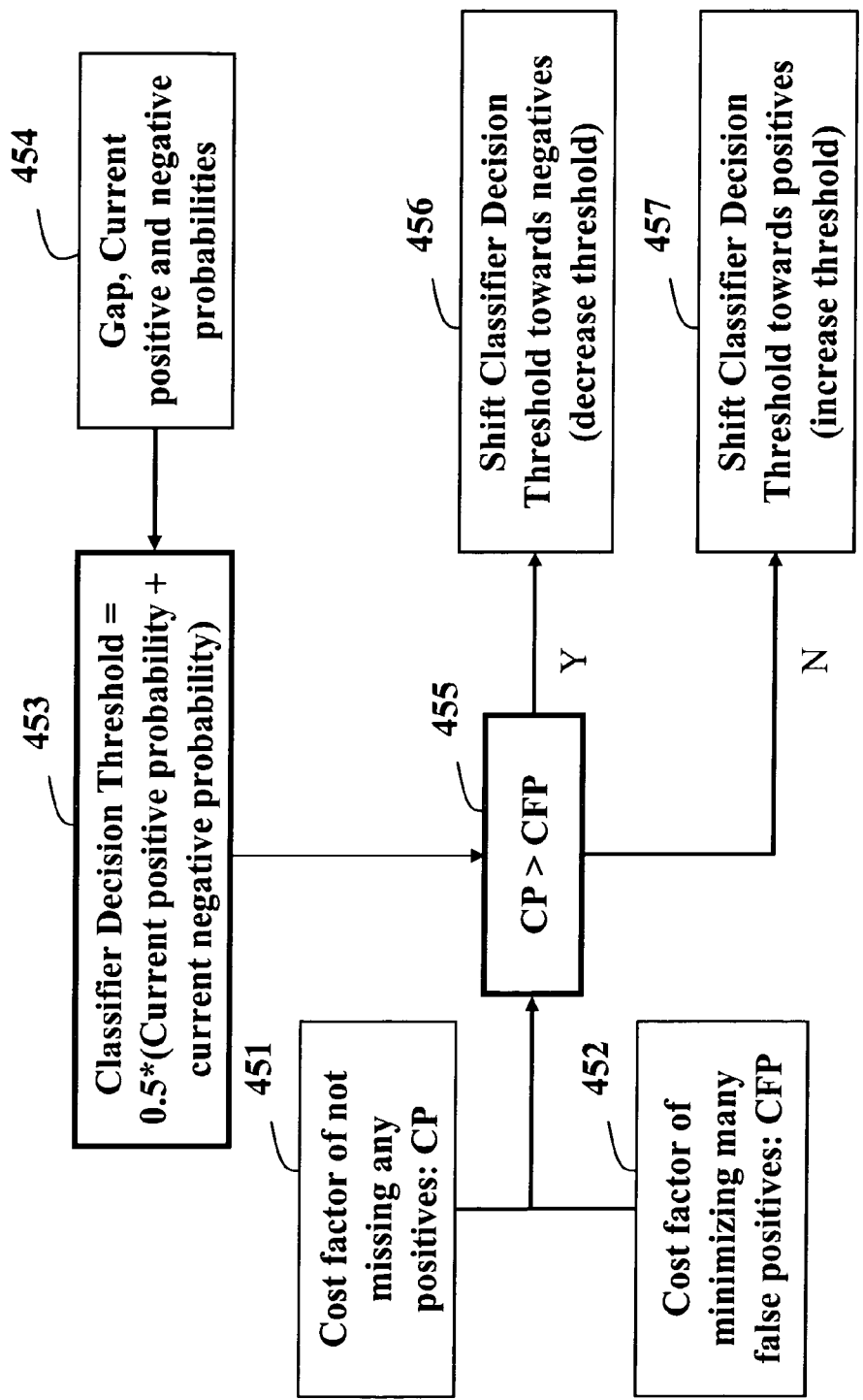

For a margin cascade classifier as shown in FIGS. 4D and 4E, a probabilistic classifier model 441 is used to train 440 a strong boosted classifier using the high-level features 301, as described above. The strong trained boosted classifier is then applied 442 to a portion of the training data 102.

Positive and negative samples of the training data are ordered 443 according to their probabilities to obtain two lists: a positive list for positive samples and a negative list for the negative samples.

Then, the probability of the particular positive example in the positive list that corresponds to the positive detection rate is obtained. This positive sample is assigned as the current positive probability. Similarly, the current negative probability is found using the negative list and the negative detection rate.

Subsequently, the current negative probability is subtracted 444 from the current positive probability to obtain a current gap. A classifier decision threshold is set 453 to the half of the summations of the current positive and current negative probabilities, see FIG. 4E described below in greater detail. Two cost factors are defined: a cost of not missing any positive samples (CP) 451; and cost of minimizing false positive samples (CFP) 452. A margin 448 for classification is set by a user or adjusted based on the detection performance of the classifiers in the cascade.

The margin is used to determine the classifier decision threshold, using the gap and probabilities of target detection and rejection rates 454, based on a target margin 448, and target detection and rejection rates 449. The result can be used to remove 446 true negative samples from the training data 102, and to add 447 false positives as negative training data.

Adjusting the Margin

A size of the margin determines the speed and accuracy of the classifier. If the margin is large, in step 455, based on the CP and CFP costs, then the speed is fast, but the classification results can be less accurate. Decreasing the size of the margin, slows down the classification but increases the accuracy of the results. If it is desired to not miss any positive samples, then the threshold is shifted 456 towards the negative samples, i.e., the threshold is decreased. If it is desired to not detect any false positive samples, then the threshold is shifted 457 towards positive samples away from the negative training samples, i.e., the threshold value is increased. Thus, our classifier is "tunable."

We repeat adding 426 classifiers to the boosted classifier, as described above, until the current gap is greater than the margin in step 445.

Cascade of Rejectors

We can also employ a cascade of rejectors and a boosting framework to increase the speed of classification process. Each rejector is a strong classifier, and includes a set of weighted linear weak classifiers as described above. The number of weak classifiers at each rejector is determined by the target true and false positive rates.

Each weak classifier corresponds to a high-dimensional feature and it splits the high dimensional input space with a decision boundary, e.g., a hyper plane. Each weak classifier makes its estimation based on a single high-dimensional feature from the high-dimensional features. Boosting works by sequentially fitting weak classifiers to reweighed versions of the training data. Using GentleBoost, we fit an additive logistic regression model by stage-wise optimization of the Bernoulli log-likelihood. GentleBoost can be characterized as an application of a Newton-Raphson optimization algorithm to the problem of minimizing a chi-square error. GentleBoost is an Adaboost variant, Friedman et al., "Additive logistic regression: a statistical view of boosting," Ann. Statist., Vol. 28, pp. 337-407, 2000, incorporated herein by reference.

Testing

During classification 140 of unknown test data 104, low-level features are extracted and used to generate high-level features, as described above. The high-level-features are eventually mapped to feature vectors, as described above, for classification 140. The classification assigns the labels 105 to the test data 104.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A computer implemented method for constructing a classifier for classifying test data, comprising the steps of:
    generating high-level features from low-level features extracted from training data, the high-level features being positive definite matrices in a form of an analytical manifold;
    selecting a subset of the high-level features;
    determining an intrinsic mean matrix from the selected subset of the high-level features;
    mapping each high-level feature to a feature vector onto a tangent space of the analytical manifold using the intrinsic mean matrix; and
    training an untrained classifier model with the feature vector to obtain a trained classifier, wherein the determining, mapping, and training steps are performed for a plurality of selected subsets of the high-level features and a plurality of untrained classifier models: and further comprising:
    assigning a weight to each feature vector during the training step;
    measuring a performance of each trained classifier; and
    selecting the trained classifier having a best performance for inclusion in a boosted classifier.

2. The method of claim 1, in which the training data are images.

3. The method of claim 2, in which the low-level features are derived from pixel intensities and colors in the images.

4. The method of claim 2, in which the low-level features are derived from motion vectors of the images.

5. The method of claim 1, in which the training data are time-series data.

6. The method of claim 1, in which the tangent space is a local Euclidian space of the analytical manifold.

7. The method of claim 1, in which the analytical manifold is a Riemann manifold.

8. The method of claim 1, further comprising:
    classifying test data using the trained classifier.

9. The method of claim 1, in which the positive definite matrices are covariance matrices.

10. The method of claim 1, in which the intrinsic mean matrix is an identity matrix.

11. The method of claim 1, in which the intrinsic mean matrix is an arithmetic average of the high-level features.

12. The method of claim 1, further comprising:
    updating the weight while repeating the measuring and selecting steps until a target positive detection rate and a target negative detection rate is reached.

13. The method of claim 12, further comprising:
    determining a probability for each positive training sample and each negative training sample in the training data; and
    ordering the positive training samples and the negative training samples according to the probability to determine a margin for the boosted classifier.

14. The method of claim 13, further comprising:
    assigning a classification decision threshold to the margin; and
    shifting the classification decision threshold in opposite direction to a cost factor.

15. The method of claim 13, further comprising:
    adjusting a magnitude of the margin to determine a speed and accuracy of the boosted classifier.

16. The method of claim 1, further comprising:
    normalizing the high-level features using other high-level features.

17. The method of claim 1, further comprising:
    constructing a cascade of rejector classifiers.

* * * * *